United States Patent Office 3,021,861
Patented Feb. 20, 1962

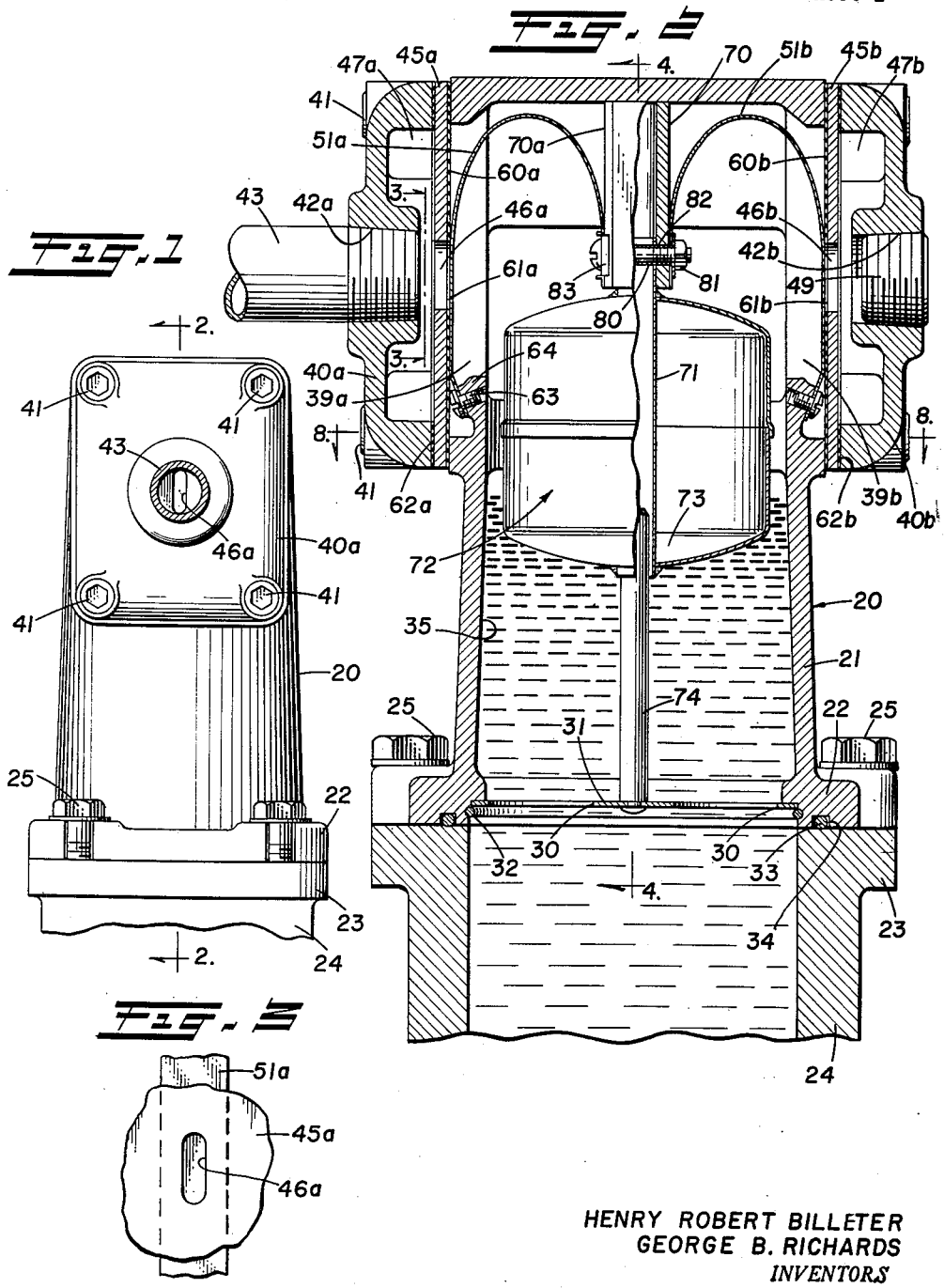

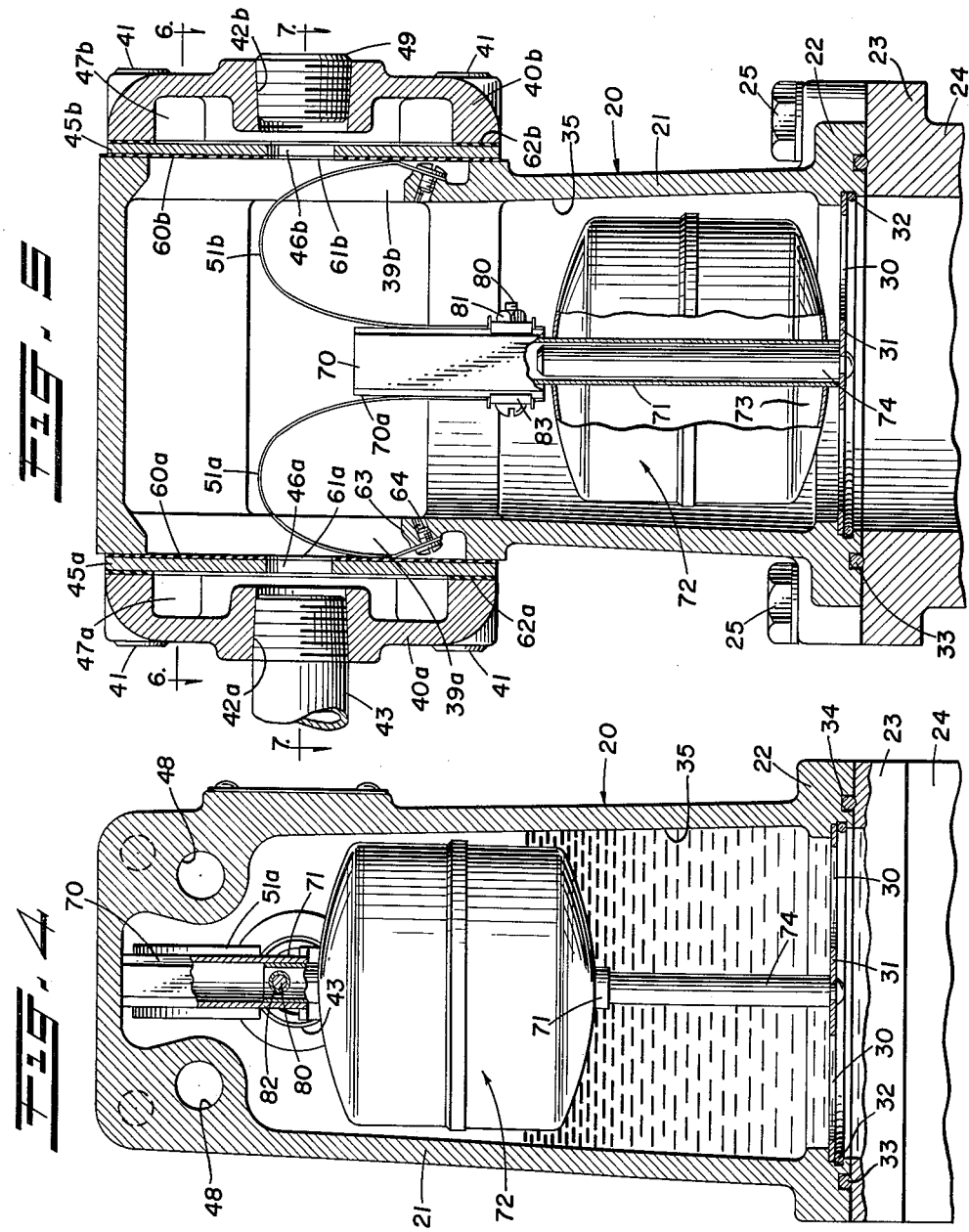

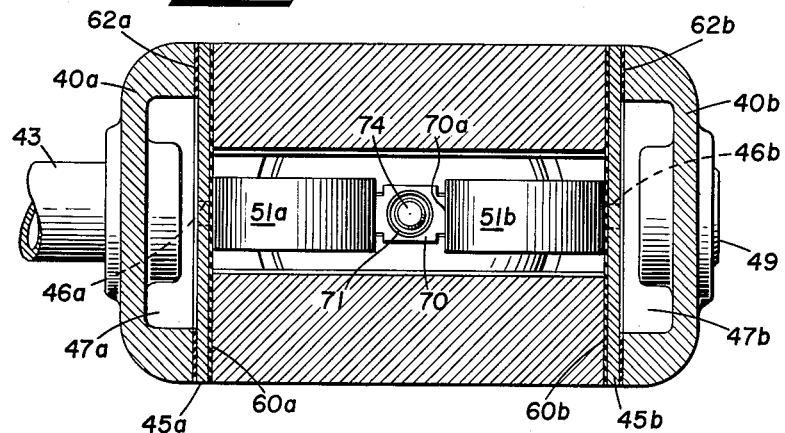
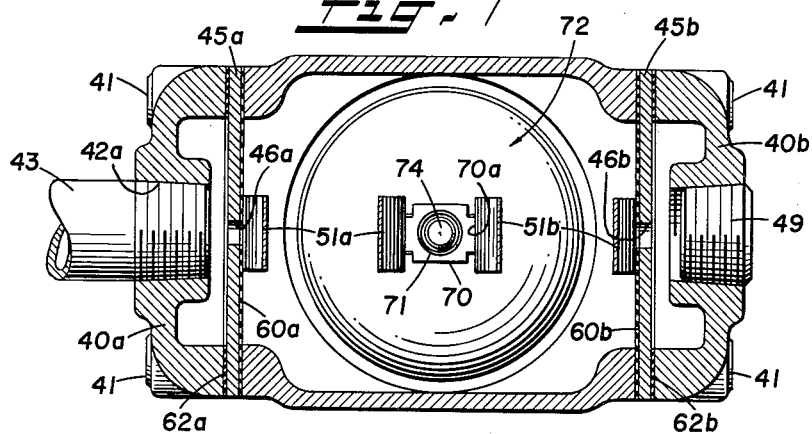
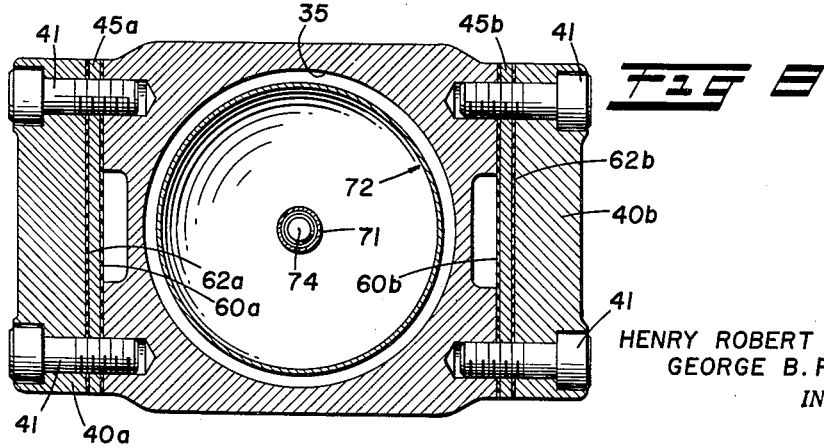

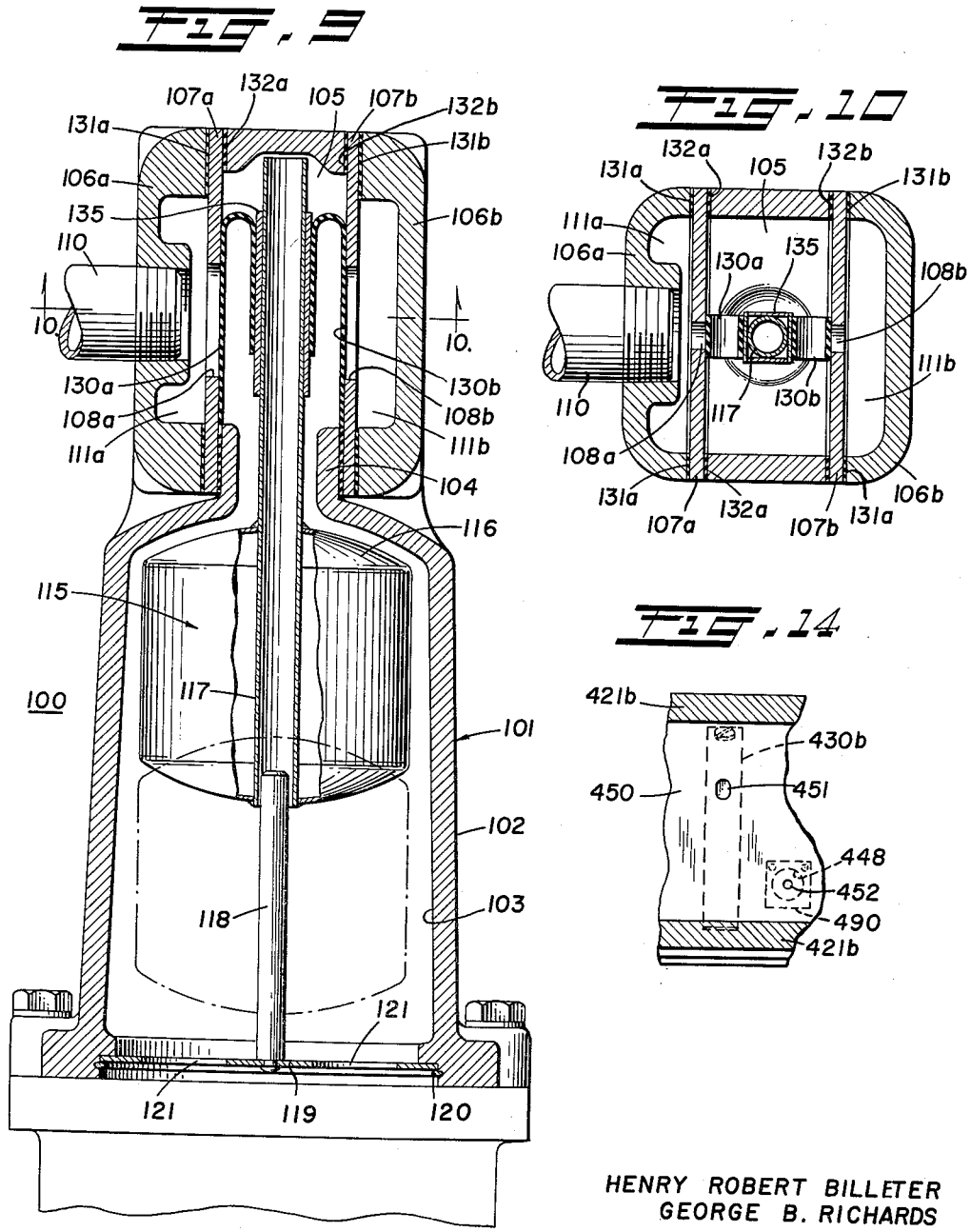

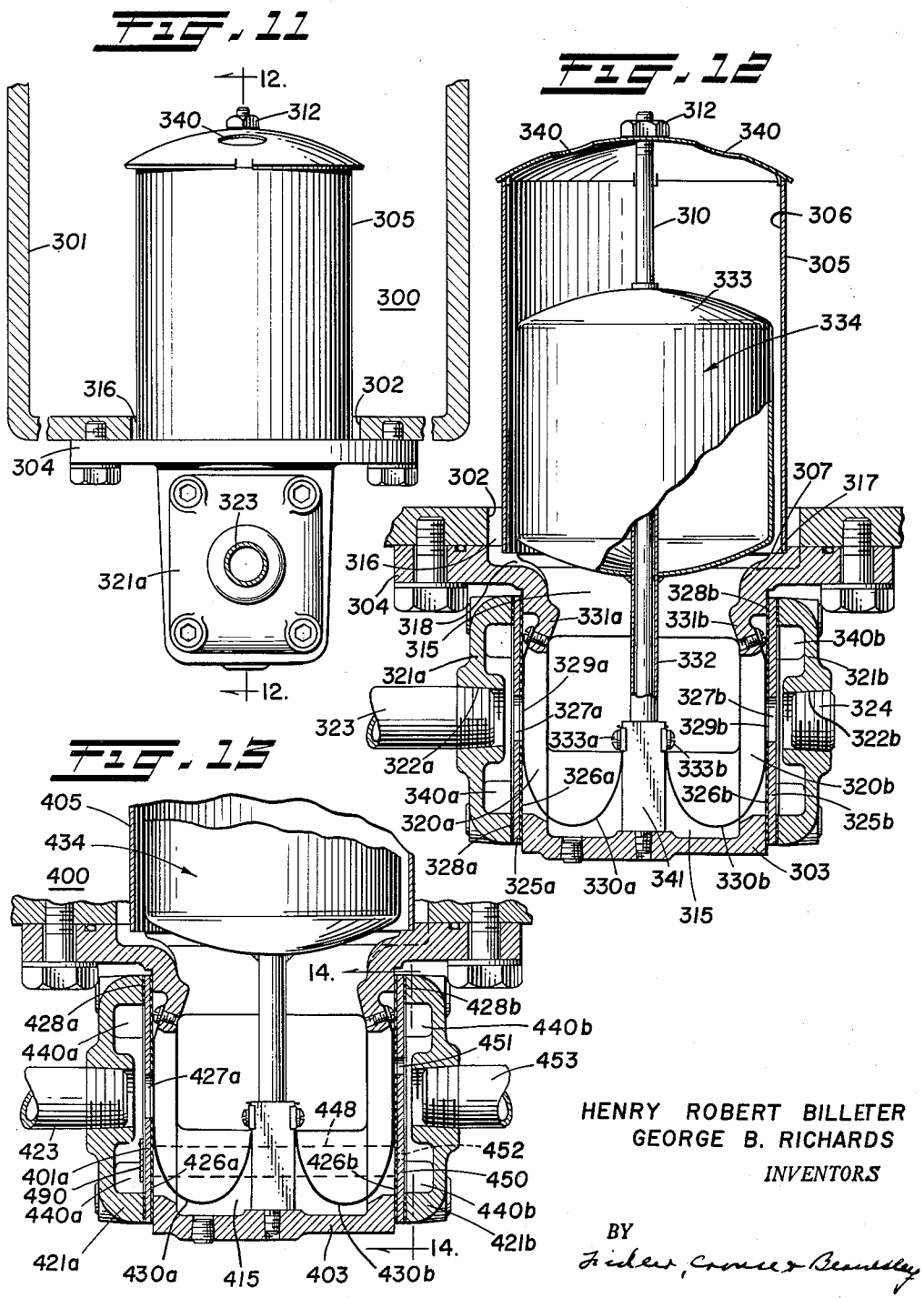

3,021,861
LIQUID-LEVEL CONTROLLED DEVICES
Henry Robert Billeter and George B. Richards, Deerfield, Ill., assignors to Liquid Controls Corporation, North Chicago, Ill., a corporation of Illinois
Continuation of application Ser. No. 512,551, June 1, 1955. This application Nov. 19, 1958, Ser. No. 775,077
11 Claims. (Cl. 137—192)

This invention relates to liquid-level controlled devices. More particularly, it relates to a novel device of the type wherein valve means is controlled in accordance with the level of a liquid in a container.

Devices having a valve or valves controlled by the level of a liquid in a container are in wide use. Among such devices are air eliminators for removing air or other gases from liquid lines. In air eliminators of conventional construction a chamber having a valve-controlled outlet is connected to a liquid line and a float is disposed in the chamber and is connected to the valve for opening or closing the valve in accordance with the liquid level in the chamber. Thus, so long as air continues to enter the chamber from the liquid line, the liquid level does not rise and the float remains at a low level so that the valve remains open. However, when the air no longer enters the chamber, the liquid level rises and lifts the float to close the valve and thus prevent further discharge of air and any discharge of the liquid.

Prior air eliminators usually employed a valve of the poppet type. A poppet valve has the disadvantage that when there is a substantial difference in pressures of the fluid on opposite sides of the valve seat, a large force is required to open the valve, which force is difficult to provide by means of a float. Various attempts have been made to provide pressure balancing means for valves for counteracting the unbalanced fluid pressure forces thereon but they have been either complicated in construction or not fully effective. Balanced slide valves also have been employed but the disadvantages thereof, such as the friction inherent therein, has rendered them generally unsatisfactory for use in air eliminators.

Devices embodying float actuated valves also are used for such varied purposes as segregating two immiscible liquids such as petroleum products and water, controlling fluid actuated devices, priming centrifugal pumps and other uses.

An object of the present invention is to provide an improved liquid-level controlled device.

Another object is to provide a liquid-level controlled device having a valve or valves which present substantially no resistance to an opening or closing force regardless of the difference in fluid pressures on opposite sides of the valve seat or seats.

Another object is to provide a liquid-level controlled device having a valve of such construction and arrangement as to be inherently balanced and to present substantially no resistance to an opening or closing force, regardless of the difference in pressure on opposite sides of the valve seat or seats.

Another object is to provide a liquid-level controlled device having a valve or valves of such construction and arrangement that the difference in fluid pressure on opposite sides of the valve seat or seats serve to aid in maintaining the valve or valves closed but presents no substantial resistance to opening or closing of the valve or valves.

Still another object is to provide a liquid-level controlled device which is simple and inexpensive to build, strong and rugged in construction, effective in operation and which requires a minimum of servicing, repair or replacement of parts over a long period of use.

Another object is to provide a new and improved valve.

Other objects and advantages of the invention will appear from the following description taken in connection with the appended drawings wherein:

FIGURE 1 is an end elevational view of one form of air eliminator embodying our invention;

FIG. 2 is an enlarged vertical sectional view taken along line 2—2 of FIG. 1;

FIG. 3 is a fragmentary sectional view taken along line 3—3 of FIG. 2;

FIG. 4 is a vertical sectional view taken along line 4—4 of FIG. 2;

FIG. 5 is a view similar to FIG. 2 only showing the device in the open position of the valves;

FIG. 6 is a horizontal sectional view taken along line 6—6 of FIG. 5;

FIG. 7 is a horizontal sectional view taken along line 7—7 of FIG. 5;

FIG. 8 is a horizontal sectional view taken along line 8—8 of FIG. 2;

FIG. 9 is a vertical sectional view showing a second embodiment of our invention;

FIG. 10 is a sectional view taken along line 10—10 of FIG. 9;

FIG. 11 is a side elevational view with parts broken away and in section of a liquid segregator embodying our invention;

FIG. 12 is an enlarged vertical sectional view taken along line 12—12 of FIG. 11;

FIG. 13 is a fragmentary vertical sectional view through a liquid segregator of somewhat different form than that shown in FIGS. 11 and 12; and FIG. 14 is a fragmentary sectional view taken along line 14—14 of FIG. 13.

Inasmuch as our invention is especially well adapted for use in air eliminators, we have illustrated it in a preferred embodiment in the application to an air eliminator. However, it will be understood as the description proceeds that the invention also is equally well adapted to other uses, as for example, in a liquid separator or segregator, two forms of which also are disclosed herein.

Referring now particularly to FIGS. 1 and 2 of the drawings, there is shown an air eliminator which includes a head 20 formed by a hollow casing 21, having a bottom flange 22 by which the head is secured to a flange 23 of a tank 24 which may be of any conventional construction. The head 20 is secured to the tank 24 in any suitable manner, as for example by machine screws 25.

The interior of the air eliminator tank 24 communicates with the interior of the head 20 through openings 30 formed in a plate 31, the purpose of which will appear hereinafter, which plate is secured in the casing 21 in a suitable manner, as by a spring ring 32. The joint between the head 21 and the casing 24 is sealed in a suitable manner as by an O ring 33 disposed in a groove 34 in the bottom face of the flange 22.

The casing 21, which at its lower portion is of generally circular cross section and at its upper portion is of generally rectangular cross section, defines a float chamber 35, which communicates relatively freely through the openings 30 with the interior of the tank 24.

The upper portion of the casing 21 at opposite portions thereof is provided with openings 39a and 39b in its ends which are closed by end plates 40a and 40b, respectively, secured to the casing as by machine screws 41.

The end plates 40a and 40b are provided with openings 42a and 42b adapted to receive a pipe such as the pipe 43, shown threaded into one of the end plates 40a (left hand end plate) in FIG. 2. In the embodiment of the invention illustrated in FIG. 2 the opening 42b in the other end plate 40b is closed as by a screw plug 49, although it is adapted to receive a pipe similar to the pipe 43.

Interposed between the casing 21 and each of the end plates respectively are orifice plates 45a and 45b which are secured in place by the screws 41 and which are provided with elongate orifices 46a and 46b respectively. The end plates 40a and 40b are recessed and provide with the respective orifice plates 45a and 45b, chambers 47a and 47b which communicate with the float chamber through the orifices 46a and 46b, except when the latter are closed by the valves hereinafter described.

Disposed against the inner face of the orifice plate 45a is a cover gasket 60a, formed with an orifice 61a corresponding in shape to the orifice 46a. A similar gasket 60b is provided for the orifice plate 45b. The gaskets 60a and 60b are clamped between the casing, and the orifice plates respectively, although they alternatively may be adhesively secured to the respective orifice plates in order to insure that they are not displaced and that the orifices in the plates and gaskets remain in alignment. Ring gaskets 62a and 62b are provided between the casing 21 and the cover plates 40a and 40b respectively. The gaskets are formed from a suitable resilient material which is sufficiently resilient to provide an effective seal between the respective members and which is resistant to the liquid with which the air eliminator is adapted to be used. We have found that a synthetic rubber such as neoprene is excellently adapted for use in forming the gasket although other materials having the desired characteristics may be applied.

The chambers 47a and 47b are connected by two passages 48 formed in the upper portion of the casing 21. Thus, even though the right hand chamber 47b is closed from the exterior by the screw plug 49, nevertheless, it communicates with the exterior through the two passages 48, the left hand chamber 47a and the pipe 43. The passages 48 thus equalize the air pressure in the chambers 47a and 47b. The gaskets 60a and 60b as well as the orifice plates 45a and 45b are provided with corresponding openings (not shown) registering with the passages 48, whereby to permit free communication between the chambers 47a and 47b. When the valves (hereinafter described) are in open position, the interior of the casing 21 (that is the float chamber 35) communicates with the pipe 43 not only through the left hand orifice 46a, but also through the right hand orifice 46b.

The orifices 46a and 46b (as well as the orifices 61a and 61b) are adapted to be closed by valves 51a and 51b which are similar in construction and accordingly only one of the valves and the associated portions of the air eliminator will be described in detail.

The valve 51a takes the form of an elongated flat strip of flexible, resilient material, preferably metal, which is inert to the liquid with which the air eliminator is adapted to be used. While any spring material having suitable flexibility, resiliency and inertness may be used, we have found that a spring steel alloy sold under the name "Elgiloy" provides excellent results.

The valve 51a is of sufficient width to extend across and completely close the orifice 46a when the valve is in closed position and is of sufficient length to permit it to be mounted and actuated as hereinafter described.

The valve strip or element 51a is rigidly secured to the casing at a point below the orifice 46a and in such position that the adjacent portion of strip lies against the face of the inside cover gasket 60a, as such shown in FIGS. 2 and 5, at all times. To this end, the lower end of the strip is secured, as by a machine screw 63, to a boss 64 projecting from the body in position to suitably support the lower end of the valve element in the desired position.

The other end of the valve element or strip 51a is attached to a tubular stop 70 which is formed with a straight, flat face 70a providing a flat surface against which the inner end of the strip is held and against which the adjacent portion of the strip lies to varying degrees as explained hereinafter. The face 70a extends parallel to the inner face of the orifice plates 45a for a purpose which will appear hereinafter. The stop 70 is connected to a guide stem 71 forming a portion of a float 72. The stop 70 in the embodiment shown is secured to and movable with the float ball and may be considered to be a part of the float. The stem 71 extends through and is sealingly secured in the "ball" portion 73 of the float and projects therefrom at each end. At its upper end the stem 71 is inserted into the stop 70 and is connected thereto by a machine screw 80 extending through these members and secured by a nut 81. A bushing 82 preferably is provided which extends through both of these members and through which the screw 80 extends. The screw 80 also serves to connect the ends of the valve elements 51a and 51b to the stop 70 as shown particularly in FIG. 2 of the drawings. A channel-shaped clip 83 is provided at each side of the stop 70 and is secured by the screw 80 and nut 81 for the purpose of retaining the ends of the valve elements 51a and 51b against twisting out of position relatively to the stop 70. The stem 71 is hollow and receives an upstanding guide post 74 which is rigidly secured in and upstands from the plate 31. The stem 71 thus serves to guide the float 72 for movement in a vertical direction within the float chamber 35.

The valve element 51a is so secured to and supported by the casing and the float that in all positions thereof throughout its range of movement from its lower, open position (as shown in FIG. 5) to its upper, closed position, it has a free portion extending between the portion which bears against the face of the orifice plate and the portion which bears against the face 70a of the stop, which free portion is bent back upon itself and assumes a curved shape. More particularly the element 51a assumes a symmetrical curved shape in which each portion on opposite sides of the vertical medial plane through the element 51a are similar. The shape is retained in all positions of the float. This is effected by attaching the valve element to the casing and stop only at its ends, disposing the face 70a and the face of the orifice plate 45a in parallelism, and providing for movement of the float in a direction parallel to these faces.

The two valve elements 51a and 51b are connected to the casing 21 and to the stop 70 at diametrically opposite points whereby the two valves 51a and 51b are disposed in opposition. Accordingly, they exert on the stop 70 and accordingly on the float 72 equal and opposite forces so that the float normally is freely positioned by the valve elements 51a and 51b in the float chamber and does not bear against the guide stem 74. The guide stem 74 however is provided so as to insure true vertical movement of the float 72 in a direction parallel to the faces of the orifice plates 45a and 45b. Each of the elements 51a and 51b therefore serves as a pressure element which yieldably resists lateral displacement of the valve actuating member 70 hereinafter described.

Since the assembly consisting of the valve elements 51a and 51b, the stop 70, and the float 72 is freely positioned, the forces exerted by the respective valve elements 51a and 51b against their respective orifice plates 45a and 45b (that is, against the gaskets 60a and 60b) are equal and the valves therefore are completely balanced against each other.

Moreover, the arrangement is such that each of the valves 51a and 51b is under stress throughout its entire range of movement which stress causes the valve to be urged against its orifice plate, throughout a portion of the valve, during its entire range of movement. As will be seen from the drawings when the float is in its lower position (see FIG. 5), the valves 51a and 51b bear against the faces of their respective orifice plates 45a and 45b throughout only the lower portions of the valves and at an area on each of the orifice plates below the orifices 46a and 46b. However, as the float 72 rises to its upper position (see FIG. 2), as established by the abutment of the stop 70 against the upper wall of the float chamber 35, the valves 51a and 51b bear against greater areas of their respective orifice plates and close the orifices 46a and 46b and bear against the plates at portions above the orifices in order to provide complete closures for the two orifices 46a and 46b. Thus it will be seen that valve elements 51a and 51b are urged into their positions closing and sealing the orifices 46a and 46b by the resilience of the valve elements 51a and 51b themselves.

From the foregoing it will be seen that the stop 70 serves not only as means for halting the upward movement of the float 72 but it serves also as an actuating element for the valve elements by transmitting to the attached ends of the valve elements movement corresponding to the movement of the float 72. Also, the stop 70 provides reaction surfaces 70a against which the inner portions of the valve elements bear. Thus the stop may also be termed a valve abutment member.

In the operation of the air eliminator thus far described, the tank 24 is suitably connected to a liquid line (not shown) from which it is desired to remove air. Assuming that the air has been removed and liquid stands in the head 20 at a level sufficient to raise the float to its uppermost position (as illustrated in FIG. 2) the valves 51a and 51b are in closed positions. Thus the valves lie against their respective orifice plates 45a and 45b and extend entirely over and sealingly close the respective orifices 46a and 46b so that no liquid can escape from the head.

It will be noted that the valves 51a and 51b lie flat against their respective orifice plates throughout a substantial zone thereof and particularly a zone on both sides of and above and below the orifices 46a and 46b so that the latter are fully closed. As noted above, the spring pressure of the valves 51a and 51b provided by reason of their bowed or arcuate form insures that the closing portions thereof are maintained against their respective orifice plates, regardless of whether or not the air or liquid within the float chamber 35 is under pressure.

When air (or other gases) enters the float chamber 35 from the liquid line such air displaces the liquid in the float chamber 35 and causes the level to fall. When this occurs the float 72, which is buoyantly supported by the liquid, also falls and carries with it the stop 70 to which the valves 51a and 51b are attached. The downward movement of the stop 70 causes the ends of the valves 51a and 51b attached thereto to move downwardly in a direction parallel to the faces of the orifice plates with the result that the portions of the valves 51a and 51b which previously lay against the orifice plates are stripped or "peeled" away from the orifice plates 45a and 45b progressively downwardly and as the downward movement of the float continues the orifices 46a and 46b are progressively uncovered in a direction from the upper portions thereof toward the lower portions.

Regardless of the differences in the pressures on the two sides of each valve seat, namely the pressure inside the float chamber and the pressure in the chambers 47a and 47b, there is substantially no resistance to the opening force exerted on the valve by the downward movement of the float. It will be seen that while there is a force resulting from the pressure differential on the two sides of the valve which is applied over that portion of the face of each of the valves which overlies the corresponding orifice and which force tends to maintain each valve against its orifice plate to close the orifice, nevertheless this force is not effective in opposing the opening of the valve. It will be seen that each of the valves is progressively pulled away from its orifice plate and, owing to the resilience of the valve and the arcuate shape into which the valve is forced by the manner in which it is attached to the casing and to the stop, the valve is moved away from the orifice plate in progressively small increments so that only a small portion of the area of the valve which overlies the orifice plate is moved away from the plate at any instant. Thus, the orifice is progressively uncovered in small increments and any force opposing the movement of such small increments of the valve away from the orifice plate is extremely small.

As stated above, the valve 51a is so supported and the arrangement of the associated elements is such that the free portion of the valve retains the same curvature in all positions of the float. Thus it will be seen that as the float moves downwardly and carries with it the corresponding end of the valve which is secured to the stop 70, the adjacent portion of the valve is progressively flattened and the portion of the valve adjacent the end which is attached to the casing is progressively curved. In other words, the arc or bend in the valve is transferred from a portion nearer to the inner, anchored end attached to the stop to a portion nearer to the outer, anchored end which is attached to the casing. However, the amount of bend in the valve and the amount of stress imparted to the valve by the bent condition remains the same. Accordingly, the amount of energy required to bend the outer portion of the valve adjacent the orifice plate is equalled by the amount of energy received from the valve by the flattening of the inner portion adjacent the end which is anchored to the stop except for insignificant loss of energy due to internal friction. Thus, no significant amount of energy is required to effect the change of position of the valve and the consequent change in the location of the curved portion of the valve.

As soon as the orifices 46a and 46b have been uncovered by the above-described opening movement of the valves 51a and 51b the air or gas trapped in the float chamber 35 above the level of the liquid in the system and which normally is under some pressure is caused to flow out of the float chamber through the orifices 46a and 46b and the vent pipe 43a by which it is conducted to a point of disposal.

When the air or other gas has been discharged to such an extent that the liquid level rises sufficiently to support and lift the float 72, the latter is elevated and causes the valves 51a and 51b to be moved in a reverse direction to that described above in connection with the opening of the valve. That is to say, that as the float 72 moves upwardly the valves are caused to progressively move against their respective orifice plates to an increasing degree and to progressively close their respective orifices until the orifices are completely closed and the valves extend in contact with their respective orifice plates both above and below the orifices. When the valves are closed no further air or gas can escape from the float chamber 35. It will be understood that during the upward movement of the float 72 and the progressive movement of the outer portions of the valves into increasing engagement with their respective orifice plate, no significant amount of energy is required to effect this movement of the valves. It will be seen that as the inner portions of the valves are progressively curved the outer portions are progressively flattened and as above explained the energy to effect the curvature is equalled by the energy received from the valves by the progressive flattening.

A second embodiment of our invention is illustrated in FIGS. 9 and 10 to which reference now is made.

The structure illustrated in FIGS. 9 and 10 is generally similar to that illustrated in FIGS. 1 to 8 inclusive and described hereinabove. However, in the structure of FIGS. 9 and 10 the portion of the head in which the orifice plates and valves is provided is of somewhat lesser width, thereby resulting in a more compact structure at the upper portion of the air eliminator head. Moreover, the structure is somewhat more simple in several respects than the structure in the air eliminator disclosed in FIGS. 1 to 8 inclusive.

The air eliminator head of FIGS. 9 and 10 includes a casing 101 having a lower portion 102 of generally circular cross-sectional shape defining a float chamber 103 and an upper portion 104 of generally rectangular cross-sectional shape defining a valve chamber 105, of substantially lesser cross-sectional area than the float chamber 103. The valve chamber 105 is formed with two open sides which are closed by end plates 106a and 106b suitably secured to the upper portion of the casing 101 as by screws (not shown). Disposed between and secured in position by the casing portion 104 and the end plates 106a and 106b are orifice plates 107a and 107b, having formed therein orifices 108a and 108b of elongated form generally similar to the orifices 46a and 46b illustrated in connection with the first embodiment of the invention.

An outlet pipe 110 is provided which is threaded into one of the end plates 106a and which provides for communication between the valve chamber 105 (through the orifice 108) and the exterior of the casing. The pipe 110 may be provided in either or both of the end plates 106 depending upon the application to which the air eliminator illustrated is used. The chambers 111a and 111b formed between the casing portion 104 and the end plates 106a and 106b are connected by passages (not shown) in a manner similar to that in which the chambers 47a and 47b of the first embodiment of the invention are connected.

A float 115 is disposed in the float chamber 103 and includes a ball portion 116 and a stem 117 of hollow form which is secured to and projects upwardly from the float 116 into the valve chamber 105.

A guide post 118 is provided which is secured to a plate 119 and is thereby supported in a vertical position wherein it is received in the stem 117 and serves to guide the float 115 for vertical movement. The plate 119 is secured in the bottom of the casing 102 as by a split-ring 120 and is provided with a plurality of openings 121 therethrough which serve to provide communication between the float chamber 103 and the interior of the tank of the air eliminator (not shown).

A pair of valves 130a and 130b is provided which valves are adapted to control the opening and closing of the orifices 108a and 108b. Each of the valves is formed from a flexible, resilient sealing material, as for example, synthetic rubber or other plastic having generally similar characteristics. Therefore, it is unnecessary to provide any sealing gasket on the faces of the orifice plates 107a and 107b although ring gaskets 131a, 131b and 132a and 132b may be provided between the upper casing portion 104 and the two end plates 106a and 106b in order to seal the joints therebetween.

The valves 130a and 130b are secured at their outer and lower ends to their respective orifice plates 107a and 107b respectively in a suitable manner as by an adhesive and are similarly secured to a bushing 135 rigidly carried by the guide stem 117. The bushing 135 is provided with two diametrically opposite flat faces which serve to provide abutments for the inner end portions of the strips 130a and 130b, in a manner corresponding to that in which the abutments are provided by the stop 70 in the first embodiment of the invention.

The valves or strips 130a and 130b are so attached to the respective orifice plates and to the bushing 135 that the two corresponding portions thereof are in parallelism throughout the entire range of movement of the float and the valves. Thus the free, unsupported portion of each valve, which extends between those portions which lie against the orifice plate and bushing respectively is free to adjust itself to an arcuate form throughout the entire range of movement of the float.

The operation of this form of our invention is generally similar to the operation of the form illustrated in FIGS. 1 to 8 and described in connection therewith, and therefore it is believed unnecessary to describe the operation of the second form in detail. It should be noted, however, that the valve elements or strips 130a and 130b are formed generally of a material which is somewhat more flexible than the material forming the valves of the first embodiment of the invention and the curvature of the free and unsupported portion of the valves is on somewhat lesser radii than the curvature of the spring strips of the first embodiment of the invention. However, this does not alter the mode of operation of the device and does not detract from the advantages obtained from our invention.

It will be noted however that the device illustrated in FIGS. 9 and 10 is somewhat more compact in its upper portion than the device illustrated in FIGS. 1 to 8 which in some instances may be found to be of advantage.

The present invention also is excellently well adapted to application to a fluid segregator. As will be understood a fluid segregator is employed in order to separate two fluids of different densities or specific gravities as for example a petroleum product and water. Such segregation is effected by causing the liquids to flow into a container whereby the heavier of the two liquids settles to the bottom of the container and accordingly may be withdrawn while the lighter of the two liquids rises toward the upper portion of the container and floats on the heavier liquid. The separation of the liquids is effected by controlling the outflow of the heavier liquid by means of a float controlled valve so that the heavier liquid flows out of the container until such time as the heavier liquid is substantially entirely withdrawn from the container whereupon the valve is closed so that none of the lighter liquid is permitted to flow from the container. In other words, the fluid segregator operates in a manner somewhat analogous to the air eliminator except that instead of removing the lighter of the two fluids at the top of the apparatus, in the segregator the heavier of the two fluids is removed from the bottom of the device.

The segregators disclosed in FIGS. 11 to 14, inclusive find particular application in the segregation or separation of water and lighter liquids, such as petroleum products. However, it will be understood that they are equally applicable to the separation or segregation of two immiscible liquids of different specific gravities and the invention is not limited to the segregation of water and a petroleum product.

The fluid segregator 300 (FIGS. 11 and 12) constructed in accordance with the present invention is disposed at the lower portion of a liquid tank or container 301 of any suitable form provided with an outlet opening 302 in which the segregator 300 is disposed. The segregator 300 includes a cup-like casing member or base 303 having a flange 304 by which the segregator is secured to the tank 301, as by screws extending through the flange 304 and into the bottom wall of the container or tank 301.

The segregator 300 includes a casing 305 defining a float chamber 306, which casing or tank 305 is supported on an inturned ledge or shoulder 307 formed on the flange 304 and underlying the opening 302 in the bottom wall of the tank 301. The casing 305 is rigidly secured in position by a rod 310 which extends through the casing 305 and downwardly into the base 303, the rod 310 being threaded into the bottom wall of the base member 303 and secured at its upper end by a nut 312. The base 303 defines a valve chamber 315 which is disposed directly below and forms a continuation of the float chamber 306.

The casing 305 is of lesser diameter than the opening 302 in the bottom wall of the tank 301 and therefore there is provided an annular passage 316 leading from the interior of the tank 301 into the chamber 315. In order to provide communication between the passage 316 and the chamber 315 a plurality of bosses 317 are provided on the flange 304 which support the lower edge of the casing 305 above the top surface of the shoulder 307 whereby a plurality of passages 318 are provided which connect the passage 316 with the chamber 315 to thereby allow free flow of liquid from the interior of the tank 301 into the chamber 315.

It will be noted at this point that the liquid segregator illustrated in FIGS. 11 and 12 constitutes in effect and with slight modifications, an inversion of the structure of the air eliminator illustrated particularly in FIGS. 1 to 8 and described hereinabove.

The base 303 is provided with open sides 320a and 320b which are closed by end plates 321a and 321b provided with openings 322a and 322b therethrough, the former of which has threaded thereinto a pipe 323 and the latter of which has threaded thereinto a plug 324 for a purpose hereinafter explained.

Secured between the end plates 321a and 321b on the one end and the base 303 on the other end is a pair of orifice plates 325a and 325b, each of which is provided with orifices 327a and 327b respectively. Secured between the casing 303 and the orifice plates 325a and 325b are gaskets 326a and 326b in a manner generally similar to the gasket disclosed in connection with the first embodiment of the invention and having orifices 329a and 329b corresponding in shape and arrangement with the orifices 327a and 327b. Ring gaskets 328a and 328b are disposed between the orifice plates 325a and 325b and the casing 303.

Valves 330a and 330b are secured to bosses 331a and 331b in a manner generally similar to the manner in which the valves 51a and 51b are secured in the first embodiment of the invention.

The inner ends of the springs or valves 330a and 330b are secured to a stop 341 which is carried at the lower end of a hollow stem 332 secured to and depending from the ball portion 333 of a float 334 reciprocable in the float chamber 306. The stem 332 is telescoped over the rod 310 and serves to guide the float through true vertical movement.

The inner ends of the valves or springs 330a and 330b are secured to the stop 341 by screws 333a and 333b in a manner generally similar to that in which the valves 51a and 51b are secured at their inner ends. It will be noted at this point that the valves 330a and 330b preferably are formed in a manner similar to that in which the valves 51a and 51b are formed, as described hereinabove.

The end plates 321a and 321b define with the casing portion 303 two chambers 340a and 340b which preferably are interconnected by passages (not shown) in a manner generally similar to that in which the corresponding chambers in the first form of the invention are connected.

In the operation of the liquid segregator, the tank 301 is connected to a liquid line which may contain liquids of two different specific gravities (or a gas and a liquid). As the liquids pass into the container 305 the heavier liquid settles to the bottom of the container and passes into the chamber 315 through the passages 316 and 318. As this occurs any of the lighter liquid which may have entered the chamber 315 is forced upwardly through the float chamber 306 and passes out of the casing 305 through suitably provided openings 340 which preferably are formed in the upper wall or roof of the casing 305 and from thence into the chamber defined by the tank 301.

It will be understood that the float 334 is so constructed that it is buoyant in the heavier of the two liquids (which for example may be water) but is not buoyant in the other and lighter liquid (which for example may be a light petroleum product). Thus the float rises and falls in accordance with the rising and falling of the level of the heavier liquid.

When there is a sufficient quantity of the heavier liquid in the float chamber 306, the float 332 is buoyantly supported in an upper position whereby the valves 330a and 330b are retained in open position. With the valves in open position the heavier liquid flows from the chamber 315 out through the orifices 327a and 327b and is discharged to a point of disposal through the pipe 323.

When the level of the heavier liquid falls below a predetermined level, the float 303 falls with the level of the heavier liquid and if the level continues to fall, the float reaches a position in which it causes the valves 330a and 330b to close. No further liquid will then flow from the casing 303 until the level of the heavier liquid and consequently the float rises to a point at which the valves 330a and 330b open.

A device constructed generally similar to the segregator illustrated in FIGS. 12 and 13 and hereinabove described but with certain minor modifications in structure may be employed effectively not only as a liquid segregator but also as means for actuating other mechanisms or devices.

Referring now to FIGS. 13 and 14, the device 400 is similar to that of FIGS. 11 and 12 except as particularly pointed out. It includes a base 403, a casing 405, a float 434, valves 430a and 430b and end plates 421a and 421b all similar to the corresponding elements of the segregator 300.

The left hand orifice plate 401a is formed with an orifice 427a and this orifice plate and its corresponding valve operate in a manner identical with the operation of the segregator 300 as above described.

On the other hand the orifice plate 450 is not provided with a central orifice but is provided with an orifice 451 of reduced size disposed at a level somewhat above the level of the upper end of the orifice 427a whereby the orifice 427a is opened by the upward movement of the liquid level prior to the time that the orifice 451 in the right hand orifice plate 450 is opened and is closed after the closing of the orifice 427a for a purpose which will hereinafter appear.

The orifice plate 450 is also provided with a small diameter opening or bleeder orifice 452 located at a point below the orifice 451 and in registry with a passage 448 which connects the chambers 440a and 440b. A flap or reed valve 490 overlies the end of the passage 448 leading into the chamber 440a and prevents reverse flow of liquid from the chamber 440a to the chamber 440b through the passage 448. The orifice 452 is located in such position that it is not closed by the spring 430b even when the float 434 is in its lowermost position and the spring 430a closes the orifice 427a.

Gaskets 426a and 426b are provided which are held against the inner faces of the orifice plates 401a and 450 and have openings corresponding to the orifices in the latter. Ring gaskets 428a and 428b are provided for sealing purposes.

The end plates 421a and 421b define with the orifice plates 426a and 450 chambers 440a and 440b. Threaded into the end plate 421a is a pipe 423 leading from the chamber 440a and a pipe 453 is similarly threaded into the end plate 421b and leads from the chamber 440b.

Contrary to the arrangement of the air eliminator 300 the only direct communication provided between the chambers 440a and 440b is that afforded by the bleeder orifice 427a and the passage 448. In fact, it is essential to the functioning of the device 400 that the chamber 440b be closed (except for the bleeder opening 452) from both the float chamber and the chamber 440a when the valve 430b is in position closing the orifice 451.

The operation of the device 400 illustrated in FIGS. 13 and 14 is generally similar to the operation of the device 300 as above described insofar as concerns the discharge of liquid through the pipe 423, as controlled by left hand valve 430a. On the other hand the operation of the valve 430b in controlling the outflow of liquid through the pipe 453 is somewhat different.

When the level of the heavier liquid is such that the float 434 is in its lower position and the valves 430a and 430b are closed, no liquid can flow from the valve chamber 415.

When the level of the heavier liquid rises, the float rises accordingly and when the level reaches a sufficient height the valve 430a opens the orifice 427a to permit outflow of the liquid therethrough. Thus, the heavier liquid is discharged through the pipe 423. However, the orifice 451 is not opened. However, should the level of the heavier liquid rise further and to such an extent that the orifice 451 in the orifice plate 450 is opened, then liquid will flow into the chamber 440b and into the pipe 453. Since this liquid is under the pressure of the head of the liquid in the container with which the liquid segregator and control device is associated, this pressure is applied to the liquid which is in the pipe 453. Accordingly, this pressure may be utilized for actuating such control device or devices (not shown) as need may be desired.

When the level of the heavier liquid falls to such a point as to cause the closing of the orifice 451 in the orifice plate 450 the communication between the pipe 453 and the interior of the chamber 415 is closed.

The bleeder opening 452 permits release of the pressure on the liquid in the pipe 453 and the connected control device (not shown).

The device illustrated in FIGS. 13 and 14 may be employed in inverted position instead of in the position shown. It will be seen that in such mode of operation, the valve 430b opens the orifice 451 when the level of the heavier liquid falls below a predetermined height and closes it when the liquid level again rises to above such height.

It will be understood that the several embodiments of our invention are suitable for use in separating two immiscible fluids of different specific gravities. Thus they may be employed in separating a liquid, and a gas, or in separating two liquids. Accordingly the embodiments which are shown in FIGS. 1 to 10 and which are described in connection with their use as air eliminators, may also be used as liquid separators. Conversely the embodiments shown in FIGS. 11 to 14 while described as liquid segregators may be employed to separate a gas and a liquid.

It will be seen from the foregoing that the present invention provides a device which is highly effective for separating two immiscible fluids of different specific gravities such as two liquids or a liquid and a gas. The device is applicable to a large number of uses, including use as an air eliminator, or as a liquid segregator, or as a control device and others.

The device of the present invention is very simple in construction and may be manufactured at relatively low cost. There is substantially no wear of the parts and there is a minimum requirement for repair, adjustment or replacement over a long period of use.

The device is relatively compact for any predetermined capacity and it may be made in a wide range of sizes for various applications.

The valve construction is not only very simple and therefore does not require complicated parts or mechanisms but is highly effective and there is no leakage past the valve at either high or low pressures.

The construction of the valve and its actuating mechanism is such that there is substantially no resistance to opening or closing and therefore the valve may be opened or closed with an extremely small force. In all of the forms of our invention the valves are balanced so that there is substantially no opportunity for frictional resistance upon the movement of the float. Because of the foregoing a very light float may be employed for operating the valve or valves and no linkage is required.

The valve is self closing and no special closing means is required. Moreover, the pressure differential across the valve seat aids in maintaining the valve closed but at the same time does not interpose any significant resistance to the opening of the valve.

This application is a continuation of our copending application Serial No. 512,551, filed June 1, 1955.

We claim:

1. Apparatus of the type described comprising casing means defining a chamber and having an opening therein communicating with said chamber and having a plurality of internal face portions disposed symmetrically about an axis, a valve actuator movable in said chamber along said axis, a plurality of normally flat, resilient strip members having first portions secured to said casing means adjacent said face portions, second portions secured to said actuator, said first and second portions being spaced apart by intermediate portions which are free and maintained in bowed shape, said strip members being bent back upon themselves and being of sufficient length so that they form two substantially parallel portions, one at the corresponding face portion and one at said second portion, whereby said strip members exert equal forces on the faces with which they cooperate respectively and position said actuator on said axis for free movement therealong, at least one of said face portions having an orifice therein in position to be closed by the corresponding strip member when said actuator is in a first position along said axis and to be exposed when said actuator is in a second position along said axis.

2. Apparatus of the type described comprising casing means defining a chamber and having an opening therein communicating with said chamber and having a plurality of internal face portions disposed symmetrically about an axis, a valve actuator including a float movable in said chamber along said axis, a plurality of normally flat, resilient strip members having first portions secured to said casing means adjacent said face portions, second portions secured to said actuator, said first and second portions being spaced apart by intermediate portions which are free and maintained in bowed shape, said strip members being bent back upon themselves and being of sufficient length so that they form two substantially parallel portions, one at the corresponding face portion and one at said second portion, whereby said strip members exert equal forces on the faces with which they cooperate respectively and position said actuator on said axis for free movement therealong, at least one of said face portions having an orifice therein in position to be closed by the corresponding strip member when said actuator is in a first position along said axis and to be exposed when said actuator is in a second position along said axis.

3. Apparatus of the type described comprising casing means defining a chamber and having an opening therein communicating with said chamber and having a pair of internal face portions disposed diametrically opposite one another in parallel relationship, a valve actuator movable in said chamber along an axis parallel to the planes of said faces, a pair of normally flat, resilient strip members each having one end secured to said casing means adjacent a face portion and the other end secured to said actuator, said ends being spaced apart by an intermediate portion which is free, maintained in bowed shape, bent back upon itself and of sufficient length so as to form two substantially parallel portions, whereby said strip members exert forces on the faces with which they cooperate respectively and position said actuator on said axis for free movement therealong, at least one of said face portions having an orifice therein in position to be closed by the corresponding strip member when said actuator is in a first position along said axis and to be exposed when said actuator is in a second position along said axis.

4. The apparatus set forth in claim 3 wherein said actuator is a float movable in said chamber along said axis.

5. Apparatus of the type described comprising casing means defining a chamber and having an opening therein communicating with said chamber and having a plurality of internal face portions disposed symmetrically about an axis, a valve actuator movable in said chamber along said axis, a plurality of normally flat, resilient strip members having first portions secured to said casing means adjacent said face portions, second portions secured to said actuator, said first and second portions being spaced apart by intermediate portions which are free and maintained in bowed shape, said strip members being bent back upon themselves and being of sufficient length so that they form two substantially parallel portions, one at the corresponding face portion and one at said second portion, whereby said strip members exert equal forces on the faces with which they cooperate respectively and position said actuator on said axis for free movement therealong, at least one orifice in each of said face portions in positions to be closed by the strip members when said actuator is in a first position along said axis and to be exposed when said actuator is in a second position along said axis.

6. The apparatus set forth in claim 5 wherein said orifices are connected together externally of said chamber.

7. Apparatus of the type described comprising casing means defining a chamber and having an opening therein communicating with said chamber and having a plurality of internal face portions disposed symmetrically about an axis, a valve actuator movable in said chamber along said axis, a plurality of normally flat, resilient strip members having first portions secured to said casing means adjacent said face portions, second portions secured to said actuator, said first and second portions being spaced apart by intermediate portions which are free and maintained in bowed shape, said strip members being bent back upon themselves and being of sufficient length so that they form two substantially parallel portions, one at the corresponding face portion and one at said second portion, whereby said strip members exert equal forces on the faces with which they cooperate respectively and position said actuator on said axis for free movement therealong, one of said face portions having an orifice therein in position to be closed by the corresponding strip member when said actuator is in a first position along said axis and to be exposed when said actuator is in a second position along said axis, and another of said face portions having an orifice therein in position to be closed by the corresponding strip member when said actuator is in a third position along said axis and to be exposed when said actuator is in a fourth position along said axis, whereby said orifices are opened and closed at different times.

8. Apparatus of the type described comprising casing means defining a chamber and having an opening therein communicating with said chamber and having a plurality of internal face portions disposed symmetrically about an axis, a valve actuator movable in said chamber along said axis, a plurality of normally flat, resilient strip members having first portions secured to said casing means adjacent said face portions, inwardly thereof, second portions secured to said actuator, said first and second portions being spaced apart by intermediate portions which are free and maintained in bowed shape, said strip members being bent back upon themselves and being of sufficient length so that they form two substantially parallel portions, one at the corresponding face portion and one at said second portion, whereby said strip members exert equal forces on the faces with which they cooperate respectively and position said actuator on said axis for free movement therealong, at least one of said face portions having an orifice therein in position to be closed by the corresponding strip member when said actuator is in a first position along said axis and to be exposed when said actuator is in a second position along said axis.

9. Apparatus as set forth in claim 8 wherein said first portions are attached to said casing along planes intercepting said face portions at an acute angle.

10. Apparatus as set forth in claim 9 wherein said acute angle is of the order of 15 degrees.

11. Apparatus of the type described comprising casing means defining a chamber and having an opening therein communicating with said chamber and having a plurality of internal face portions disposed symmetrically about an axis and equidistant therefrom, a valve actuator movable in said chamber along said axis, a plurality of substantially identical, normally flat, resilient strip members having first portions secured to said casing means adjacent said face portions, second portions secured to said actuator, said first and second portions being spaced apart by intermediate portions which are free and maintained in bowed shape, said strip members being bent back upon themselves and being of sufficient length so that they form two substantially parallel portions, one at the corresponding face portion and one at said second portion, whereby said strip members exert equal forces on the faces with which they cooperate respectively and position said actuator on said axis for free movement therealong, at least one of said face portions having an orifice therein in position to be closed by the corresponding strip member when said actuator is in a first position along said axis and to be exposed when said actuator is in a second position along said axis.

References Cited in the file of this patent

UNITED STATES PATENTS

| 22,170 | Douglas | Nov. 30, 1858 |
| 2,180,173 | Share | Nov. 14, 1939 |
| 2,699,801 | Schleyer | Jan. 18, 1955 |
| 2,720,218 | Otto | Oct. 11, 1955 |

FOREIGN PATENTS

| 536,543 | Great Britain | May 19, 1941 |
| 897,639 | Germany | Nov. 23, 1953 |